US007107290B2

(12) United States Patent
Davis et al.

(10) Patent No.: US 7,107,290 B2
(45) Date of Patent: Sep. 12, 2006

(54) METHOD AND SYSTEM FOR AUTOMATICALLY CHECKING-OUT/IN AND REPLICATING DOCUMENTS IN DATABASES

(75) Inventors: Jeffrey Michael Davis, Rochester, MN (US); Ronal Richard French, Oronoco, MN (US); James Andrew Hoppa, Rochester, MN (US); Brian Richard Lepel, Rochester, MN (US); Nathan G. Steffenhagen, Eau Claire, WI (US)

(73) Assignee: International Business Machines Corporation, Armonk, NY (US)

(*) Notice: Subject to any disclaimer, the term of this patent is extended or adjusted under 35 U.S.C. 154(b) by 428 days.

(21) Appl. No.: 10/144,509

(22) Filed: May 13, 2002

(65) Prior Publication Data

US 2003/0212697 A1    Nov. 13, 2003

(51) Int. Cl.
*G06F 17/30* (2006.01)
*G06F 7/00* (2006.01)
(52) U.S. Cl. ............................... 707/201; 707/10
(58) Field of Classification Search ............... 707/204, 707/203, 101, 10, 201, 3, 8
See application file for complete search history.

(56) References Cited

U.S. PATENT DOCUMENTS

| 5,884,324 A | | 3/1999 | Cheng et al. | |
|---|---|---|---|---|
| 5,926,816 A | * | 7/1999 | Bauer et al. | 707/8 |
| 6,263,433 B1 | | 7/2001 | Robinson et al. | |
| 6,449,624 B1 | * | 9/2002 | Hammack et al. | 707/203 |
| 2002/0026440 A1 | * | 2/2002 | Nair | 707/3 |
| 2002/0065879 A1 | * | 5/2002 | Ambrose et al. | 709/203 |

OTHER PUBLICATIONS

Multi Master Replication Set-up Scripts for Oracle® 8.0.x on Unix, Metalink, Oracle® Sep. 17, 1999.*
Oracle® 7 Server Distribution System, vol. II: Replicated Data, Release 7.3, vol. II, Feb. 1996, Oracle®.*

* cited by examiner

*Primary Examiner*—John Cottingham
*Assistant Examiner*—Kuen S. Lu
(74) *Attorney, Agent, or Firm*—Patterson & Sheridan, LLP

(57) ABSTRACT

Methods and systems for conveniently and quickly checking-out/checking-in and replicating a document record from/to a server instance of a document database to/from a local replica of the document database are provided. One embodiment provides a computer-implemented method for accessing a document record stored in a server document database system from a client system, comprising: receiving user selection of a document record from a replica database in the client system; querying the server document database system for the document record; determining whether the document record is available for check-out from the server document database system; and if the document record is available for check-out, replicating the document record to the replica database in the client system.

20 Claims, 3 Drawing Sheets

METHOD AND SYSTEM FOR AUTOMATICALLY CHECKING-OUT/IN AND REPLICATING DOCUMENTS IN DATABASES

BACKGROUND OF THE INVENTION

1. Field of the Invention

The present invention generally relates to methods and systems for accessing document records in document databases. More particularly, the present invention relates methods and systems for replicating document records from a server instance of a document database to a local replica of the document database and updating document records from the local replica of the document database to the server instance of the document database.

2. Description of the Related Art

Databases are computerized information storage and retrieval systems. A document database is an organized collection of information in which related collections of documents are stored. A document database, such as Lotus Notes from IBM, comprises one or more databases which contain document records. A document record is defined as an object containing text, graphics, video, or audio objects or any other kind of "rich text" data. A document database may contain document records comprising semi-structured records created through forms and fields.

Forms are masks through which a user can view the data of a document record or create a document record and enter data. A field is an area on a form that contains a single type of information. The fields on a form define the type of information the documents can contain. The types of information may include: text, rich text, multiple choice lists or keywords, numbers, times or dates, and user names. Rich text includes voice, video, binary objects and multi-font text, tabular data, World Wide Web pages, and linked or embedded objects. The document records may be indexed and retrieved by any of the fields within the document records. Also, the document records may be indexed and retrieved by the actual contents of the document record.

Document records in a document database may be located and displayed by a user through views, folders and/or navigators. Views display document summary type fields in rows and columns for a user to find particularly interested document records. Views may be programmed to group the information according to specific criteria. Folders display lists of document records for user selection. Navigators provide a graphical way for a user to find documents or take actions without having to maneuver through views or find the commands on a pull-down menu.

Commonly, document databases are part of a distributed system comprising a plurality of servers and clients, as in the case of the client-server model. Typically, the clients and servers communicate via a local area network (LAN) or wide area network (WAN) using well-known protocols such as Transmission Control Protocol and Internet Protocol (TCP/IP). The clients typically make requests to the servers, which manage one or more databases. Once a response for the client's request is formulated, the response is provided to the client.

Databases on a server system are typically replicated to one or more client systems. Data replication refers to the copying of data (e.g., a database or a portion of a database) from a primary database to a user's local system. In one aspect, replication allows the user to retrieve updated data information pertinent to previous database requests as the data becomes available. Further, databases are often replicated to reduce contention or access to a primary database or provide stand alone work systems and spaces. Replicated databases provide work fields that allow users and clients to create or inspect data without limiting access by others to a primary database. For clients interested in only specific aspects of the primary database, replicas of particular regions or fragments can be provided to avoid absorbing excess resources. Replicated databases also provide a backup in the event of media failure.

To ensure that a replicated document record has the most current updates, a client must check-out the corresponding document record from the server database and replicate any changes to the client's database. Currently, the process for checking-out a document from a server instance of a document database (e.g., Lotus Notes Server) to a local replica of the document database (e.g., Lotus Notes Client) involves several manual steps that must be performed by a user on both the server instance of the document database and the local replica of the document database. First, a user must access the server and find the server instance of the document database containing the document record which the user wants to check-out. Second, the user selects the document record (e.g., highlighting the document record within a view through a document database application). Third, the user requests a check-out of the document record on the server (e.g., clicks on a "Check-Out" action button). After successfully checking-out the document record on the server instance of the document database, the user exits the server instance of the document database. Then, the user must locate and access a local replica instance of the document database which may be stored in a storage system connected to the user's computer system. For example, the local replica may be stored in a storage system belonging to a local area network. Lastly, the user forces a manual replication of the local replica with the server instance of the database.

The current document check-out process can be very time consuming because the process requires a user to enter/exit multiple instances (e.g., both the server instance and the local replica) of a document database. Furthermore, the process requires a user to force a manual replication. In addition to the manual steps performed by a user, accessing a database on a server may be time consuming. Depending on the state of the network at the time of the access, a user may have to wait a long time to connect to the server or make several attempts to access the server. The processes and repercussions are similar for the current process for checking-in a document record from the local replica to the server instance of the document database.

Therefore, there is a need for a method and a system for conveniently and quickly checking-out and replicating a document record from a server instance of a document database to a local replica of the document database. Also, there is a need for a method and a system for conveniently and quickly checking-in and updating a document record from the local replica to the server instance of the document database.

SUMMARY OF THE INVENTION

The present invention generally provides a method and a system for conveniently and quickly checking-out and replicating a document record from a server instance of a document database to a local replica of the document database. The present invention also provides a method and a system for conveniently and quickly checking-in and updating a document record from the local replica to the server instance of the document database.

One embodiment provides a computer-implemented method for accessing a document record stored in a server document database system from a client system, comprising: receiving user selection of a document record from a replica database in the client system; querying the server document database system for the document record; determining whether the document record is available for check-out from the server document database system; and if the document record is available for checkout, replicating the document record to the replica database in the client system. The method may further comprise receiving user selection for checking-in the document record from the client system to the server document database system; querying the server document database system for the document record; determining whether the record is available for check-in on the server document database system; and updating the document record in the server document database system.

Another embodiment provides a computer readable medium containing a program which, when executed, performs an operation for accessing a document record stored in a server document database system from a client system.

Another embodiment provides a computer system configurable for accessing a document record stored in a server document database system, the computer system comprising: a memory containing a document check-out/in program and a replica database comprising a plurality of document records; and a processor which, when executing the document check-out/in program, is configured to: receive user selection of a document record from a replica database in the client system; query the server document database system for the document record; determine whether the document record is available for check-out from the server document database system; and if the document record is available for check-out, replicate the document record to the replica database in the client system.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

The present invention generally provides a method and a system for conveniently and quickly checking-out and replicating a document record from a server instance of a document database to a local replica of the document database. The present invention also provides a method and a system for conveniently and quickly checking-in and updating a document record from the local replica to the server instance of the document database.

One embodiment of the invention is implemented as a program product for use with a computer system such as, for example, the network environment 100 shown in FIG. 1 and described below. The program(s) of the program product defines functions of the embodiments (including the methods described below with reference to FIGS. 2 and 3) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
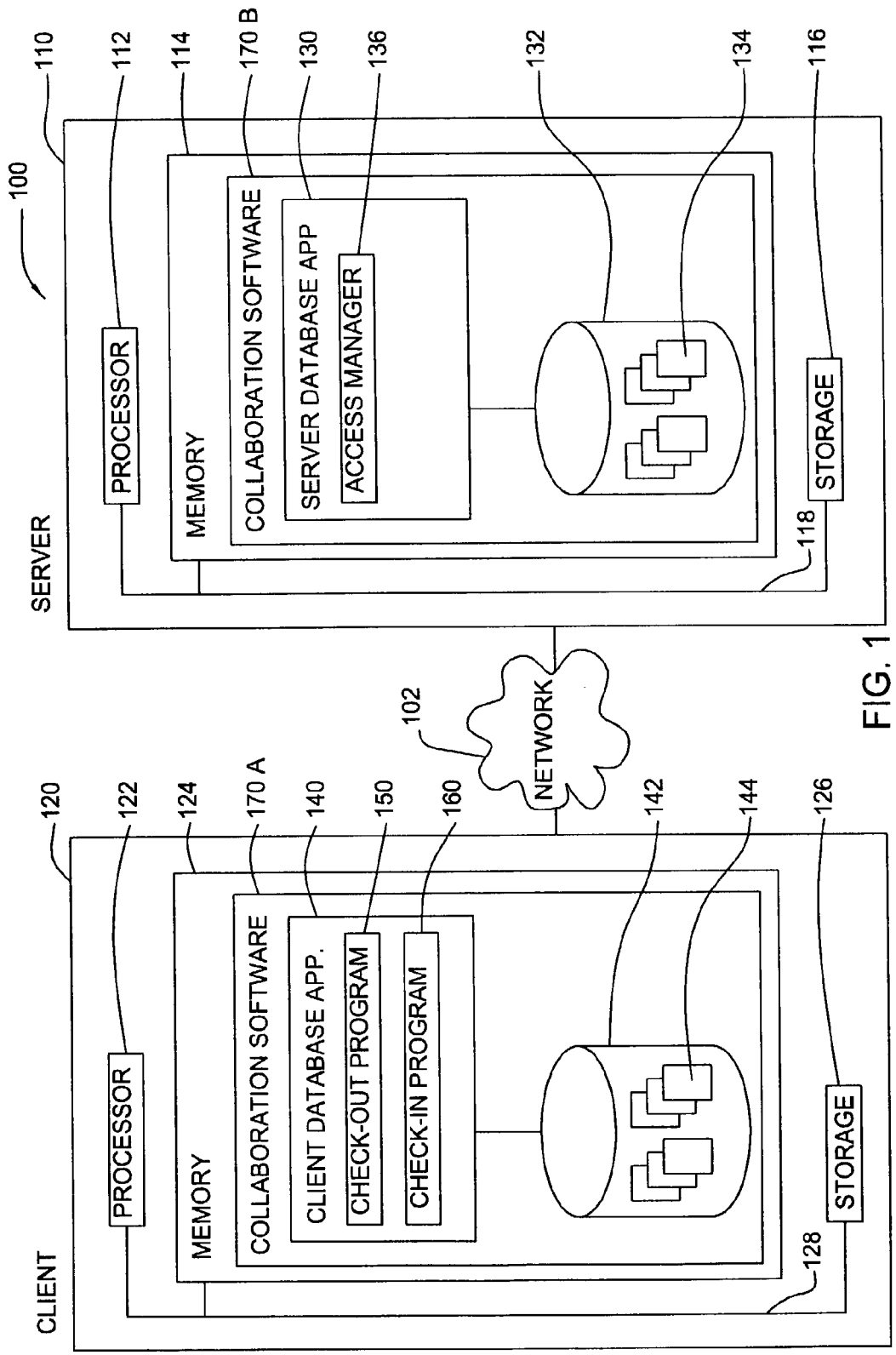
FIG. 1 is a schematic diagram illustrating a networked database environment 100.

FIG. 1 is a schematic diagram illustrating a networked database environment 100. In general, the networked database environment 100 comprises a server computer 110 connected in communication with one or more client computers 120 (only one shown) through a network 102. The network 102 may be any local area network (LAN) or wide area network (WAN) capable of supporting the appropriate information exchange according to embodiments provided herein. In one embodiment, the network 102 is the Internet. In another embodiment, the network 140 may be a combination of LANs and WANs. The client computer 120 and the server computer 110 may be connected in communication through Transmission Control Protocol/Internet Protocol (TCP/IP) or other communication protocols.

The server computer 110 generally comprises a processor 112, a memory 114 and a storage device 116 connected by a bus 118. Storage 116 may comprise a direct access storage device (DASD). Although it is shown as a single unit, storage 116 could be a combination of fixed and/or removable storage devices, such as fixed disc drives, floppy disc drives, tape drives, removable memory cards, or optical storage. Memory 114 and storage 118 could be part of one virtual address space spanning multiple primary and secondary storage devices. The main memory 114 could be one or a combination of memory devices, including Random Access Memory, nonvolatile or backup memory, (e.g., programmable or Flash memories, read-only memories, etc.) and the like. In addition, memory 117 may be considered to include memory physically located elsewhere in the system 100, for example, any storage capacity used as virtual memory or stored on a mass storage device or on another computer coupled to the server computer 110 via the bus 118.

The memory 114 includes a server database application 130 and a server database 132. The server database 132 contains a plurality of document records 134. The server database application 130 may include an access manager 136 which manages user access to the server database 132. The access manager 136 may utilize name and address books (NABs), user group list, access control lists (ACLs) and/or other user/group access information to grant user authorization to access the server database 132. In one embodiment, the access manager 136 determines whether the user on the client computer 120 is authorized to access the server computer 110 and the server database 132 as well as the type of access to be granted.

The client computer 120 generally comprises a processor 122, a memory 124 and a storage device 126 connected by a bus 128. Storage 126 may comprise a direct access storage device (DASD). Although it is shown as a single unit, storage 118 could be a combination of fixed and/or removable storage devices, such as fixed disc drives, floppy disc drives, tape drives, removable memory cards, or optical storage. Memory 124 and storage device 126 could be part of one virtual address space spanning multiple primary and secondary storage devices. The main memory 124 could be one or a combination of memory devices, including Random Access Memory, nonvolatile or backup memory, (e.g., programmable or Flash memories, read-only memories, etc.) and the like. In addition, memory 124 may be considered to include memory physically located elsewhere in the system 100, for example, any storage capacity used as virtual memory or stored on a mass storage device or on another computer coupled to the client computer 120 via the bus 128.

The memory 124 includes a client database application 140 and a replica database 142. The replica database 142 contains a plurality of document records 144. In one embodiment, the document records 144 are replicated from the server database 132. A user or an administrator may initiate or request the first replication of the document records 134 from the server database 132, or alternatively, the server database application 130 may include a scheduled replication of all or a portion of the document records 134 in the server database 132 to the replica database 142. The client database application 140 may include a plurality of programs for accessing and interacting with the server computer 110. For example, the client database application 140 may be utilized to request access to the server computer 110 and the server database 132. The access manager 136 on the server computer 110 determines whether to grant access to a user on the client computer 120 in response to a request from the client computer 120. The access manager may be utilized to grant access to the server computer 110 and access to particular server databases connected to the server computer 110, such as server database 132.

The client database application 140 includes a document check-out program 150 and a document check-in program 160 which facilitate user access of document records in the server document database 132. The document check-out program 150 provides convenient and quick check-out and replication of a document record from a server instance of a document database to a local replica of the document database. The document check-in program 160 provides convenient and quick check-in and updates of a document record from the local replica to the server instance of the document database.

In one implementation, the server database application 130 and the client database application 140 are part of a collaborative software 170. In such an embodiment, a server version of the collaborative software executes on the server computer 110, and a client version of the collaborative software executes on the client computers 120. The collaborative software maybe any software which allows development, management and distribution of information in a group environment via a database. An example of a collaborative software is Lotus Notes, available from IBM, Inc. It is contemplated that the client computer 120 and the server computer 110 may be configured with messaging facilities. One messaging facility that can be used to advantage is the MQSeries from IBM, Inc. The particular methods for data transmission are not limiting of the present invention and persons skilled in the art will recognize a number of suitable mechanisms, whether known or unknown.

The systems shown in FIG. 1 are merely illustrative configurations for data processing systems. Embodiments of the invention can apply to any comparable configuration, regardless of whether the data processing systems are complicated multi-user apparatus, single-user workstations, or network appliances that do not have non-volatile storage of their own.

Figure 2:
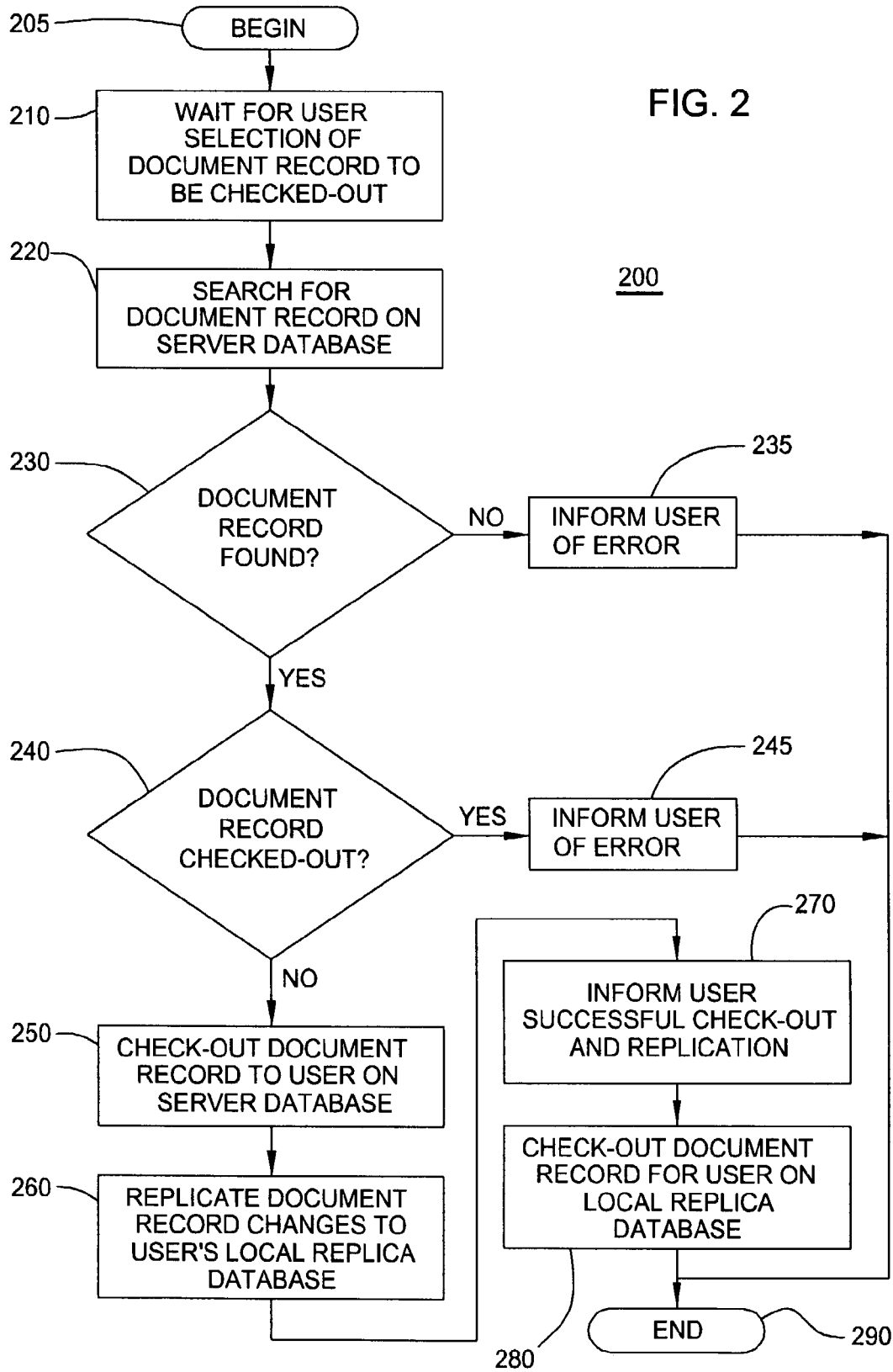
FIG. 2 is a flow chart illustrating one embodiment of a method for automating check-out of a document record in a server document database from a client computer.

FIG. 2 is a flow chart illustrating one embodiment of a method for automating check-out of a document record in a server document database from a client computer. The method 200 represents one embodiment of the automatic document check-out program 150 as shown in FIG. 1. The method 200 begins at block 205 and proceeds to block 210 to wait for user selection of a document on the local replica database 144. The user may select a document record on a local replica database through a view, a folder, or a navigator function provided by the client database application 140. In one embodiment, the user may make the selection by highlighting the document record and clicking a "Check-Out" button. Once a user selection has been received, the method 200 proceeds to search for the selected document in the server document database at block 220. In one embodiment, the method 200 determines the identification (e.g., Unique ID or UNID) of the selected document record and queries the server document database 132 to locate the document record on the server document database 132 having a matching identification.

Next, at block 230, the method 200 determines whether the selected document has been found in the server document database 132 (document records having matching UNIDs). If the selected document was not found, the method 200 informs the user (e.g., display an error message) that the selected document was not found in the server document database at block 235 and ends the program at block 290. If the selected document was found in the server document database 132, the method 200 determines whether the selected document is checked out from the server document database at block 240. In one embodiment, the method 200 checks a field in the document record which indicates whether the record is currently checked-out. If the selected document is currently checked-out from the server document database by another user, the method 200 informs the user that the selected document is currently not available for check-out at block 245 and ends the program at block 290. If the selected document is not checked-out from the server document database (i.e., the document is available for check-out to the user), the method 200 proceeds to block 250 to check out the document from the server document database. In one embodiment, the method 200 updates the field in the document record to indicate that the record is currently checked-out and specifies in another field in the document record that the user has checked-out the document record (e.g., input username to the field).

Next, at block 260, the method 200 replicates the updated document record from the server document database 132 to the local replica database 142. At block 270, the method 200 informs the user that the document record has been successfully checked-out from the server document database 132 and replicated to the replica database 142. At block 280, the method 200 checks-out the document record from the local replica database 142 for the user, and then the method 200 ends at block 290.

Figure 3:
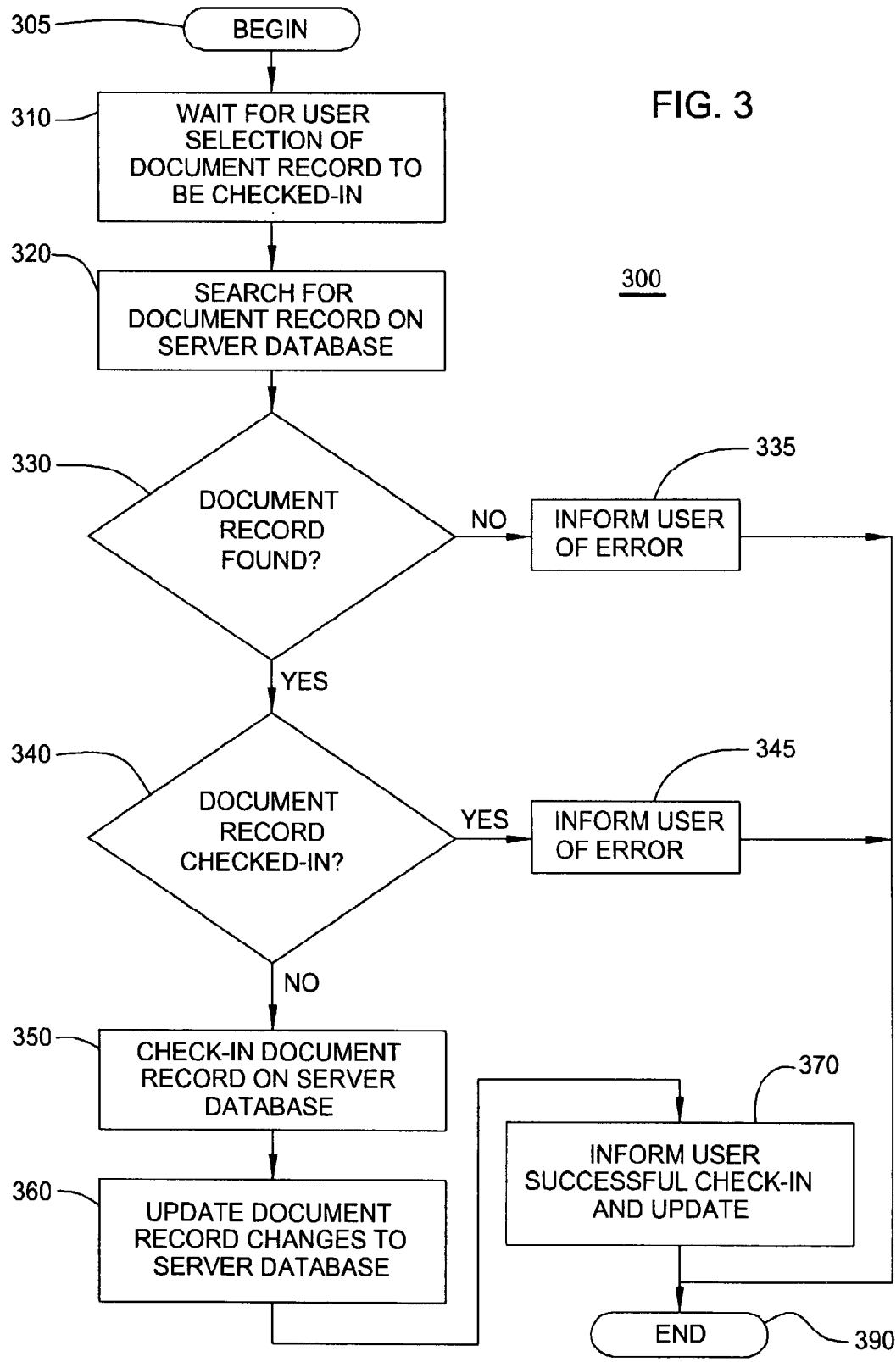
FIG. 3 is a flow chart illustrating one embodiment of a method for automating checking-in of a document record from a replica database to a server document database.

FIG. 3 is a flow chart illustrating one embodiment of a method for automating checking-in of a document record from a replica database to a server document database. The method 300 represents one embodiment of the automatic document check-in program 160 as shown in FIG. 1. The method 300 begins at block 305 and proceeds to block 310 to wait for user selection of a document record on a local replica database to be checked-in to a server database. In one embodiment, a user may highlight a document record and click on a "Check-In" button to select the document record to be checked-in. Once a user selection has been made, the method 300 proceeds to search for the selected document in the server document database 132 at block 320. In one embodiment, the method 200 determines the identification (e.g., Unique ID or UNID) of the selected document record and queries the server document database 132 to locate the document record on the server document database 132 having a matching identification. Next, at block 330, the method 300 determines whether the selected document has been found in the server document database 132. If the selected document was not found, the method 300 informs the user that the selected document was not found in the server document database 132 at block 335 and ends the program at 390. If the selected document was found in the server document database 132, the method 300 determines whether the selected document is available for check-in to the server document database 132 at block 340. If the selected document is not available for check-in (e.g. document record is checked-out to another user) on the server document database 132, the method 300 informs the user that the selected document is not available for check-in at block 345 and ends the program at 390. If the selected document record is available for check-in on the server document database 132 (i.e., the document record is available for check-in by the user), the method 300 proceeds to block 350 to check-in the document record on the server document database 132 and update any changes to the document record on the server document database 132 at block 360. At block 370, the method 300 informs the user that the document record has been successfully checked-in and updated to the server document database 132. The program ends at block 390.

The present invention eliminates many manual steps that must be performed by a user to obtain an updated document record from a server database. Particularly, the present invention performs automated functions for accessing the server database, finding the corresponding document record on the server database, checking-out the document record on the server database, and initiate replication of the document record to the local replica. Similarly, the present invention eliminates many manual steps that must be performed by the user to check-in a document record to the server database. The present invention simplifies user access of document records from/to a server document database and reduces the time spent/wasted by the user in accessing document records.

While the foregoing is directed to embodiments of the present invention, other and further embodiments of the invention may be devised without departing from the basic scope thereof, and the scope thereof is determined by the claims that follow.

What is claimed is:

1. A computer-implemented method for accessing a document record stored in a server document database system from a client system, comprising:
   receiving, by the client system, user selection of a client instance of a document record from a replica database in the client system; and
   in response to the user selection of the client instance of the document record:
      querying the server document database system for a server instance of the document record;
      determining whether the server instance of the document record is available for check-out from the server document database system; and
      if the server instance of the document record is available for check-out from the server document database system, checking-out the server instance of the document record on the server system, replicating the server instance of the document record to the replica database in the client system and displaying an updated client instance of the document record on the client system, whereby the client instance of the document record is updated automatically in response to the user selection of the client instance of the document record and without an explicit user request to perform the update.

2. The method of claim 1, further comprising:
   checking-out the replicated document record on the client system.

3. The method of claim 1, further comprising:
   informing the user that the server instance of the document record has been replicated to the client system.

4. The method of claim 1, further comprising:
   displaying an error message if the server instance of the document record was not found in the server document database system.

5. The method of claim 1, further comprising:
   displaying an error message if the server instance of the document record was not available for check out from the server document database system.

6. The method of claim 1, further comprising:
   receiving, by the client system, user selection of the client instance of the document record for checking-in the document record from the client system to the server document database system;
   querying, in response to the user selection, the server document database system for the server instance of the document record;
   determining whether the server instance of the document record is available for check-in on the server document database system; and
   updating the server instance of the document record in the server document database system.

7. The method of claim 6, further comprising:
   informing the user that the document record has been checked-in and updated to the server document database system.

8. The method of claim 1 wherein the querying step comprises verifying a document identification of the document record.

9. A computer readable storage medium containing a program which, when executed, performs an operation for accessing a document record stored in a server document database system from a client system, the operation comprising:
- receiving, by the client system, user selection of a client instance of a document record from a replica database in the client system; and
- in response to the user selection of the client instance of the document record:
  - querying the server document database system for a server instance of the document record;
  - determining whether the server Instance of the document record is available for check-out from the server document database system; and
  - if the server instance of the document record is available for check-out from the server document database system, checking-out the server instance of the document record on the server system, replicating the server instance of the document record to the replica database in the client system and displaying an updated client instance of the document record on the client system, whereby the client instance of the document record is updated automatically in response to the user selection of the client instance of the document record and without an explicit user request to perform the update.

10. The computer readable storage medium of claim 9, wherein the operation further comprises checking-out the replicated document record on the client system.

11. The computer readable storage medium of claim 9, wherein the operation further comprises informing the user that the server instance of the document record has been replicated to the client system.

12. The computer readable storage medium of claim 9, wherein the operation further comprises displaying an error message if the client instance of document record was not found In the server document database system.

13. The computer readable storage medium of claim 9, wherein the operation further comprises:
- receiving, by the client system, user selection of the client instance of the document record for checking-in the document record from the client system to the server document database system;
- querying, in response to the user selection, the server document database system for the server instance of the document record;
- determining whether the server instance of the document record is available for check-in on the server document database system; and
- updating the server instance of the document record in the server document database system.

14. The computer readable storage medium of claim 13, wherein the operation further comprises informing the user that the server instance of the document record has been checked-in and updated to the server document database system.

15. The computer readable storage medium of claim 9, wherein the program is part of a collaborative software and wherein the client computer executes a client instance of the collaborative software.

16. A computer system configurable for accessing a document record stored in a server document database system, the computer system comprising:
- a memory containing a document check-out/in program and a replica database comprising a plurality of document records; and
- a processor which, when executing the document check-out/in program, is configured to receive user selection of a client instance of the document record from the replica database in the computer system; and, in response to the user selection of the client instance of the document record, the processor is further configured to:
  - query the server document database system for a server instance of the document record;
  - determine whether the server instance of the document record is available for check-out from the server document database system; and
  - if the server instance of the document record is available for check-out from the server document database system, check-out the server instance of the document record on the server system, replicate the server instance of the document record to the replica database in the computer system and display an updated client instance of the document record on the computer system, whereby the client instance of the document record is updated automatically in response to the user selection of the client instance of the document record and without an explicit user request to perform the update.

17. The computer system of claim 16, wherein the computer system is a client computer system executing a client instance of a collaborative software.

18. The computer system of claim 17, wherein the processor is further configured to check-out the replicated document record on the client computer system.

19. The computer system of claim 17, wherein the processor is further configured to:
- receive, by the client system, user selection of the client instance of the document record for checking-in the document record from the client computer system to the server document database system;
- query, in response to the user selection, the server document database system for the server instance of the document record;
- determine whether the server instance of the document record is available for check-in on the server document database system; and
- update the server instance of the document record in the server document database system.

20. The computer system of claim 19, wherein the processor is further configured to inform the user that the server instance of the document record has been checked-in and updated to the server document database system.

* * * * *